US012687204B2

(12) United States Patent
Kurematsu

(10) Patent No.: US 12,687,204 B2
(45) Date of Patent: Jul. 21, 2026

(54) SELECTABLE CLUTCH AND DISCONNECT MECHANISM

(71) Applicant: TSUBAKIMOTO CHAIN CO., Osaka (JP)

(72) Inventor: Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 19/269,246

(22) Filed: Jul. 15, 2025

(65) Prior Publication Data

US 2026/0022742 A1     Jan. 22, 2026

(30) Foreign Application Priority Data

Jul. 22, 2024     (JP) ................................. 2024-116716

(51) Int. Cl.
| | |
|---|---|
| *F16D 15/00* | (2006.01) |
| *B60K 23/08* | (2006.01) |
| *F16D 41/04* | (2006.01) |
| *F16D 41/07* | (2006.01) |
| *F16D 41/08* | (2006.01) |
| *F16D 47/04* | (2006.01) |

(52) U.S. Cl.
CPC ............. *F16D 15/00* (2013.01); *F16D 41/04* (2013.01); *F16D 41/07* (2013.01); *F16D 41/088* (2013.01); *F16D 47/04* (2013.01); *B60K 23/08* (2013.01)

(58) Field of Classification Search
CPC ........ F16D 15/00; F16D 41/04; F16D 41/064;

F16D 2041/0646; F16D 41/07; F16D 41/08; F16D 41/084; F16D 41/086; F16D 41/088; F16D 47/04; B60K 1/02; B60K 17/02; B60K 17/26; B60K 17/34; B60K 23/08

See application file for complete search history.

(56) References Cited

U.S. PATENT DOCUMENTS

| | | | |
|---|---|---|---|
| 4,901,831 A * | 2/1990 | Ito ............................ | F16D 15/00 |
| | | | 192/45.01 |
| 6,065,576 A | 5/2000 | Shaw et al. | |
| 6,354,414 B1 * | 3/2002 | Sueshige .............. | B60K 7/0007 |
| | | | 192/45.005 |

(Continued)

FOREIGN PATENT DOCUMENTS

| | | |
|---|---|---|
| JP | 2002-506958 A | 3/2002 |
| JP | 2019-516930 A | 6/2019 |

(Continued)

*Primary Examiner* — Richard M Lorence
(74) *Attorney, Agent, or Firm* — WHDA, LLP

(57) ABSTRACT

A selectable clutch includes a selector that performs ON/OFF operations of a first clutch mechanism. The first clutch mechanism includes a power-transmitting element that transmits or cuts off power between an input-side rotating element and an output-side rotating element in both rotational directions. The selector is coupled to an input shaft element, and coupled to the input-side rotating element by an engaging mechanism having a circumferential play permitting a relative rotation with respect to the input-side rotating element within a predetermined rotational angle range. A disconnect mechanism is configured such that the output-side rotating element is coupled to an auxiliary driving wheel axle, and the selector is coupled to the motor shaft of an auxiliary driving motor.

7 Claims, 7 Drawing Sheets

(56) References Cited

U.S. PATENT DOCUMENTS

2017/0343060 A1    11/2017  Voelker et al.

FOREIGN PATENT DOCUMENTS

| | | | |
|---|---|---|---|
| JP | 2021-156432 | A | 10/2021 |
| JP | 2022-038806 | A | 3/2022 |
| JP | 2022-047794 | A | 3/2022 |
| JP | 2022-165688 | A | 11/2022 |
| JP | 2022-190947 | A | 12/2022 |

* cited by examiner

SELECTABLE CLUTCH AND DISCONNECT MECHANISM

BACKGROUND OF THE INVENTION

1. Field of the Invention

The present invention relates to a selectable clutch suitably used as a disconnect clutch, and a disconnect mechanism including the selectable clutch.

2. Description of the Related Art

As one example of a disconnect clutch for transmitting or disconnecting the power from the input shaft to the output shaft, a ratchet engagement clutch which uses mechanical engagement to connect the input shaft and the output shaft has been known.

Having been known as an example of such a clutch is a clutch having a configuration in which a pocket plate and a notch plate, each having a flat clutch surface, are disposed relatively rotatably with respect to each other, with the clutch surfaces thereof facing each other, and in which a strut is disposed in a manner of being housed in each of a plurality of recessed receptacles provided on the clutch surface of the pocket plate, and moreover in which a plurality of notches (engaging recesses) are provided to the clutch surface of the notch plate (see, for example, Japanese Translation of PCT Application No. 2002-506958 and Japanese Translation of PCT Application No. 2019-516930).

In such a ratchet clutch, the struts are biased toward the notch plate by springs provided to the respective recessed receptacles, and when the notch plate is rotated relatively with respect to the pocket plate in an engaging direction, the struts partially become engaged with the respective engaging recesses, and enabled to transmit power, and, when the notch plate is rotated relatively with respect to the pocket plate in the opposite direction of the engaging direction, the struts are disengaged from the engaging recesses and transmission of the power is disabled.

Between the pocket plate and the notch plate, a select plate that is relatively rotatable with respect to the pocket plate is disposed. With the relative rotation of the select plate, the clutch can be switched between the configuration in which the power can be transmitted and the configuration in which the transmission of power is disabled.

Also having been known is a structure with a ratchet mechanism that includes, for example, a plurality of claw members (pawl) that are torque-transmission members rotatably provided on the inner periphery of an outer race, and teeth that are provided on an outer periphery of an inner race, and that become engaged with the claw members (see, for example, Japanese Patent Application Laid-open No. 2021-156432, Japanese Patent Application Laid-open No. 2022-190947, Japanese Patent Application Laid-open No. 2022-038806, Japanese Patent Application Laid-open No. 2022-047794, and Japanese Patent Application Laid-open No. 2022-165688).

For example, a ratchet clutch described in Japanese Patent Application Laid-open No. 2021-156432 includes: a plurality of first claw members that are biased radially inward by springs; and a plurality of second claw members that are biased radially inward by springs and that are oriented differently from the first claw members in the circumferential direction. The first claw members are then configured to lock the rotation of an inner race in one direction while allowing rotation of the inner race in the other direction, and the second claw members are configured to allow the rotation of the inner race in the one direction while locking the rotation of the inner race in the other direction.

An annular switching plate is disposed adjacently on one side of the inner race in the central axis direction and coaxially with the inner race. This switching plate is enabled to switch the combinations of engagement and disengagement of the first claw members and the second claw members with respect to the teeth on the inner race, by the rotation of the switching plate.

SUMMARY OF THE INVENTION

All of the clutches disclosed in the cited literatures described above therefore require a dedicated actuator, a worm gear mechanism coupling the clutch and the actuator, for example, and a selecting mechanism such as a shift fork or a cylindrical cam.

Such requirement leads not only to an increase in the number of components, but also to an increase in parts to be machined or man-hours required in assembly, disadvantageously, and increase the manufacturing costs. Furthermore, because the space for positioning the selecting mechanism and actuator as well as attachments are required in addition to the space for assembling a clutch, the size of the unit is also increased.

Furthermore, because the control for switching the operation mode of the clutch requires not only control of the driving motor but also control of the operation of the actuator, the control tends to be more complicated.

The present invention has been made based on such circumstances, and an object of the present invention is to provide an easy-to-assemble selectable clutch not requiring the adjustment of a selector, having a simple structure, and capable of switching the operation mode, with a smaller size and a longer life time.

Another object of the present invention is to provide a disconnect mechanism with a simpler and smaller structure, and capable of smoothly and quickly switching the driving mode of a four-wheel drive vehicle.

The present invention relates to a selectable clutch including a first clutch mechanism including an input-side rotating element, an output-side rotating element, and a power-transmitting element that transmits or cuts off power between the input-side rotating element and the output-side rotating element in both rotational directions, and a selector that performs ON/OFF operations of the first clutch mechanism, in which the selector is coupled to an input shaft element to which a rotational torque is input, and coupled to the input-side rotating element by an engaging mechanism having a circumferential play permitting a relative rotation with respect to the input-side rotating element within a predetermined range of rotational angle.

According to this first aspect of the present invention, the operation mode of the selectable clutch can be switched only by controlling the magnitude and the rotational direction of the rotation torque exerted on the selector. Therefore, the needs for an actuator, a driver, a controller, and a selector mechanism for driving the selector, as well as the adjustment the like of the selecting mechanism are eliminated. It is also possible to reduce the number of components, as well as to simplify and to reduce the size of the structure, and the assembly is made easy and the manufacturing cost can be reduced by reducing the number of parts to be machined and man-hours required in assembly. Furthermore, because not only the structure itself but also the control for switching the operation mode can be simplified, it is possible to reduce failures and defects, and to provide a selectable clutch that is maintenance-free and that has a longer life time.

According to a second aspect of the present invention, by causing the selector to switch the first clutch mechanism to an OFF state for disabling the transmission of the power in both of the rotational directions, the operation mode of the selectable clutch can be switched to a one-way lock mode in which transmission of power via the second clutch mechanism is either enabled or disabled.

According to a third aspect of the present invention, the operation mode of the selectable clutch can be switched reliably only by controlling the magnitude and the rotational direction of the rotational torque exerted on the selector.

According to a fourth aspect of the present invention, because the clearance between dog teeth of an outer race and dog teeth of the selector serves as a rotational play, it is possible to switch the operation mode of the selectable clutch using a simple structure.

According to a fifth aspect of the present invention, because the first clutch mechanism is configured as a two-way roller-ratchet clutch, the torque is transmitted between the inner race and the outer race by nipping each of the rollers in the circumferential direction between a pocket and a support groove corresponding thereto. Therefore, the selectable clutch can be configured as a highly rigid clutch without any windup (elastic deformation) during the transmission of the torque. Furthermore, it is possible to achieve a stable engagement with a simple structure, to achieve a size reduction, and to dispose a large number of rollers in a limited space, so that the transmission of high torque is made possible. Furthermore, because bearing pressure exerted on each roller and wall surfaces by which the roller are nipped at the time of torque transmission can be kept low, the rollers can be designed using an inexpensive material that is resistant to breakage due to a shock and wearing. Furthermore, because the rollers themselves rotate, it is less likely for the engagement to be formed at the same position, so that it is also possible to ensure a longer life time.

According to a sixth aspect of the present invention, because the second clutch mechanism is configured as a one-way cam clutch, engagement and idling are switched automatically on the basis of the rotational speed of the outer race and the rotational speed of the inner race. Hence, it is possible to achieve high responsiveness and to a desired torque capacity.

According to a seventh aspect of the present invention, by switching the operation mode of the selectable clutch by controlling the number of revolutions and the rotational direction of the auxiliary driving motor, it is possible to switch to transmit the power of and to disconnect the transmission of power of the auxiliary driving motor to the auxiliary driving wheels, while a four-wheel drive vehicle is driving forward as well as backward, and to simplify and to reduce the size of the structure. Furthermore, because the selectable clutch is configured to automatically switch to become engaged and to idle in accordance with the rotational speeds of the outer race and the inner race, it is possible to smoothly and quickly switch the driving mode of the four-wheel drive vehicle.

DESCRIPTION OF THE PREFERRED EMBODIMENTS

Figure 1:
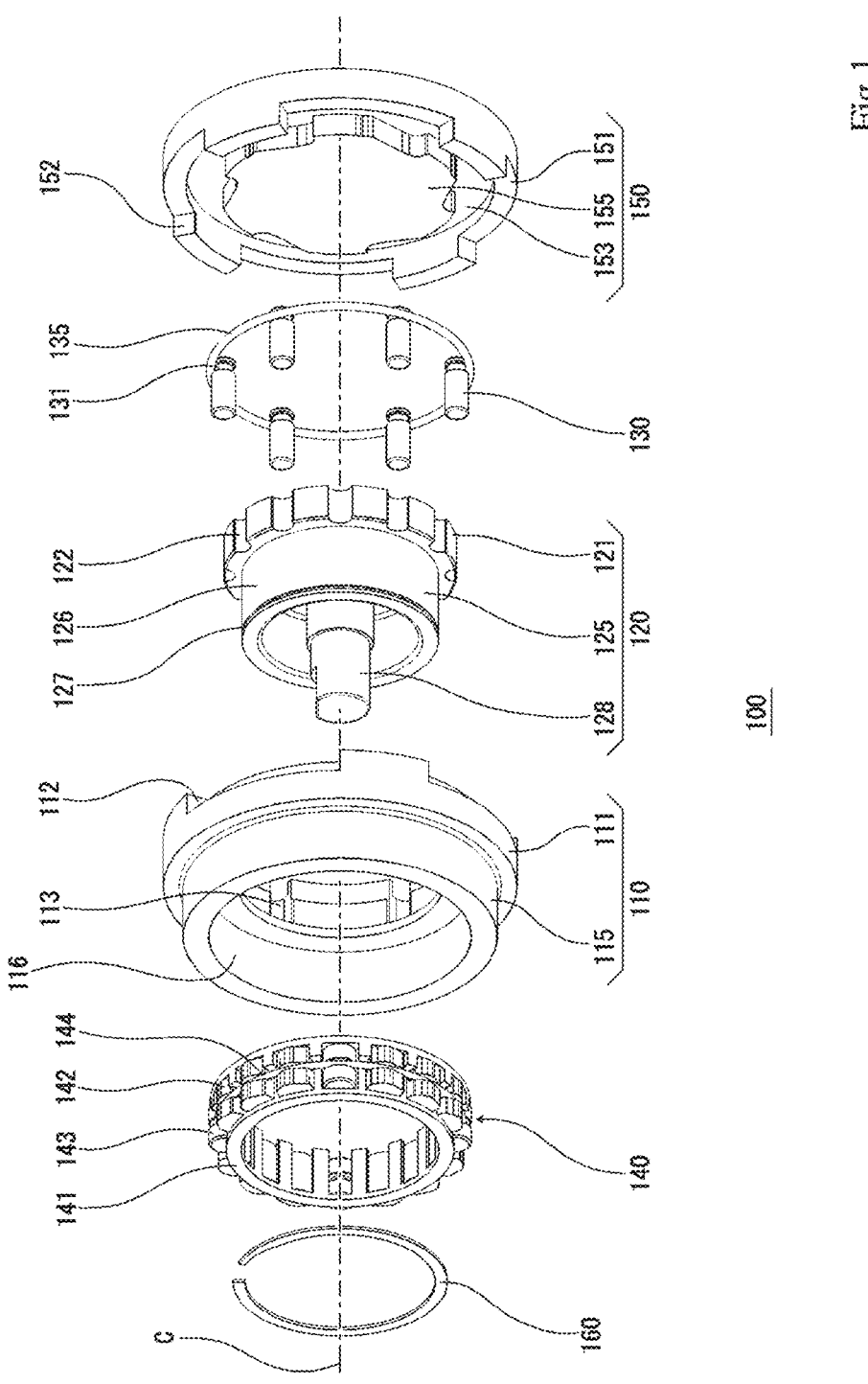
FIG. 1 is an exploded perspective view illustrating a structure of a selectable clutch according to an embodiment of the present invention.
Figure 2:
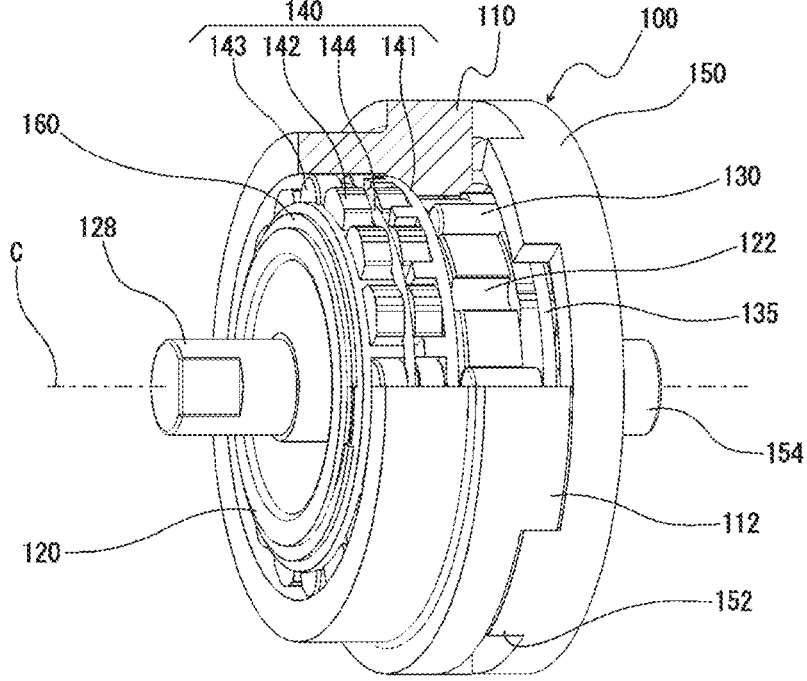
FIG. 2 is a partial cutaway perspective view when the operation mode of the selectable clutch illustrated in FIG. 1 is a two-way lock mode.
Figure 3:
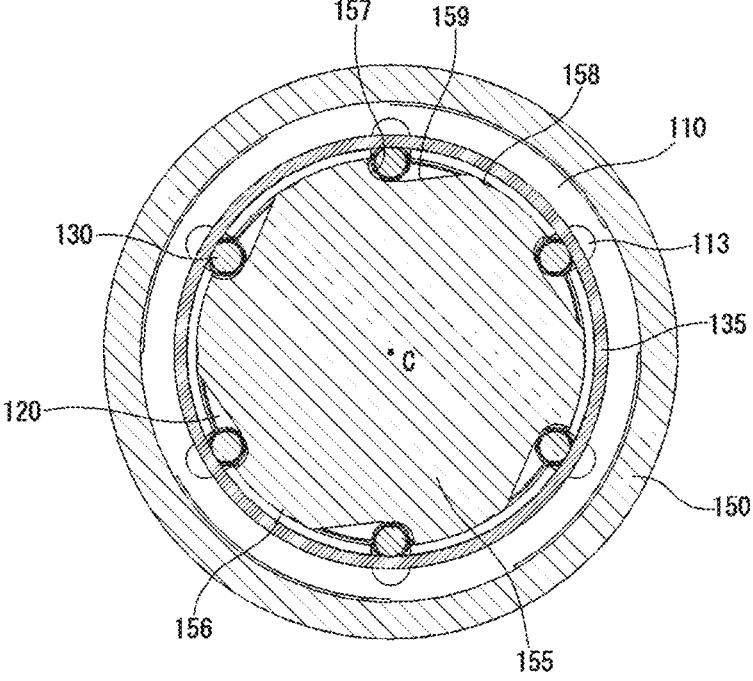
FIG. 3 is a cross-sectional view illustrating the first clutch mechanism taken along a plane perpendicular to the rotational axis when the operation mode of the selectable clutch is the two-way lock mode, with a viewpoint on the other end side in the axial direction.
Figure 4:
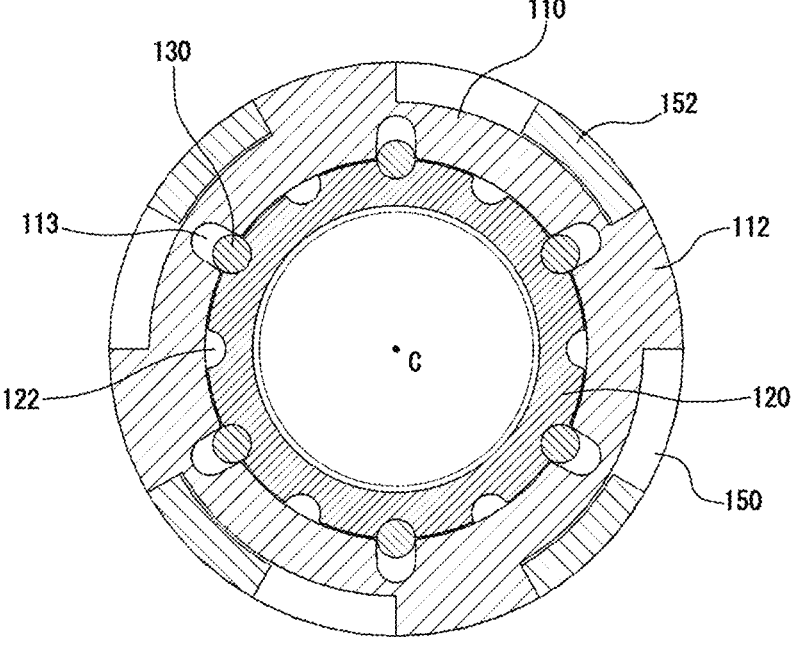
FIG. 4 is a cross-sectional view illustrating the first clutch mechanism taken along a plane perpendicular to the rotational axis at a different position from that in FIG. 3 when the operation mode of the selectable clutch is the two-way lock mode, with a viewpoint on the other end side in the axial direction.

A selectable clutch according to an embodiment of the present invention will now be explained with reference to drawings.

As illustrated in FIGS. 1 to 6, this selectable clutch 100 according to the embodiment includes a first clutch mechanism configured as a two-way roller clutch, and a second clutch mechanism configured as a one-way cam clutch.

The selectable clutch 100 includes an outer race 110 that is an input-side rotating element, an inner race 120 that is an output-side rotating element provided coaxially and relatively rotatably with respect to the outer race 110, a plurality of rollers 130 that are power-transmitting elements of the first clutch mechanism, a cam clutch unit 140 forming a power-transmitting element of the second clutch mechanism, and a selector 150 for performing ON/OFF operations of the first clutch mechanism, that is, an operation of switching the operation mode of the first clutch mechanism between an ON state (lock mode) in which the first clutch mechanism is enabled to transmit power in both of the rotational directions and an OFF state (free mode) in which the transmissions of the power in both of the rotational directions are cut off. The outer race 110 and the inner race 120 are configured as common elements shared between the first clutch mechanism and the second clutch mechanism.

The outer race 110 has a first cylindrical part 111, a second cylindrical part 115 that is coaxially disposed as the first cylindrical part 111 and continuous to one end of the first cylindrical part 111 in the axial direction.

The first cylindrical part 111 has an outer diameter larger than the outer diameter of the second cylindrical part 115 and an inner diameter smaller than the inner diameter of the second cylindrical part 115. Therefore, one axial end of the first cylindrical part 111 projects radially inward from the inner peripheral surface of the second cylindrical part 115, and the internal space of the outer race 110 is partitioned thereby in the axial direction. In this embodiment, this internal space of the first cylindrical part 111 serves as a space where a large-diameter cylindrical part 121 of the inner race 120, to be described later, is disposed. The internal space of the second cylindrical part 115 serves as a space where the cam clutch unit is disposed, and the inner peripheral surface of the second cylindrical part 115 provides a raceway surface 116 with which cams 142 of the cam clutch unit 140 come into contact.

On the inner peripheral surface of the first cylindrical part 111, a plurality of pockets 113 corresponding to the plurality of rollers 130 and enabled to house the respective rollers 130 are provided at positions that are aligned at predetermined intervals in the circumferential direction.

In this embodiment, the pockets 113 are provided as concave grooves each having a cross-sectional shape delineated by combining an isosceles trapezoid with a circle that is tangent to the two legs of the isosceles trapezoid, for example, and in a manner extending radially outward.

The inner race 120 includes a large-diameter cylindrical part 121 one axial end of which is closed, a small-diameter cylindrical part 125 disposed coaxially with the large-diameter cylindrical part 121 and continuous to one axial end of the large-diameter cylindrical part 121, and a shaft 128 provided in a manner extending axially from an end wall of the large-diameter cylindrical part 121 at a rotational axis C, and projecting axially outward from an open end of the small-diameter cylindrical part 125.

The inner race 120 is inserted from the other end side of the outer race 110 in the axial direction, and the large-diameter cylindrical part 121 of the inner race 120 is positioned by becoming locked with a partitioning wall partitioning the internal space of the outer race 110. The small-diameter cylindrical part 125 of the inner race 120 is positioned inside the second cylindrical part 115 of the outer race 110, and the outer peripheral surface serves as a raceway surface 126 with which the cams 142 of the cam clutch unit 140 come into contact. The other end surface of the large-diameter cylindrical part 121 of the inner race 120 is positioned on one-end side with respect to the other end surface of the outer race 110 in the axial direction, with the outer peripheral surface thereof positioned closely facing the inner peripheral surface of the first cylindrical part 111 of the outer race 110. The shaft 128 is coupled to an output shaft element (not illustrated) to which the rotational torque is output.

On the outer peripheral surface of the large-diameter cylindrical part 121 of the inner race 120, a plurality of support grooves 122 each extending in the axial direction are provided in a manner aligned in a circumferential direction at predetermined intervals. In this embodiment, while six rollers 130 are aligned at predetermined intervals along the circumferential direction, the support grooves 122 are provided in a number larger than the number of the rollers 130. The number of rollers 130 is not limited to a particular number, and the intervals at which the rollers are aligned does not necessarily need to be equal, either.

In this embodiment, each of the support grooves 122 is provided as, for example, an arc-shaped concave groove that can support the roller 130 by receiving a part of the peripheral surface of the roller 130. The edge of the opening of the support groove 122 may be C-chamfered or R-chamfered, for example.

The small-diameter cylindrical part 125 has a peripheral groove 127 provided along one axial end of the outer peripheral surface. By installing a snap ring 160 to this peripheral groove 127, a disengagement prevention mechanism preventing the cam clutch unit 140 from coming off in the axial direction is implemented.

Each of the plurality of rollers 130 has a shape, with the roller 130 fitted in the corresponding pocket 113, projecting axially outward from the other end surface of the first cylindrical part 111 of the outer race 110. On the peripheral surface of this projecting part, an elastic member mounting groove 131 is provided across the entire circumference in the circumferential direction.

Figure 5:
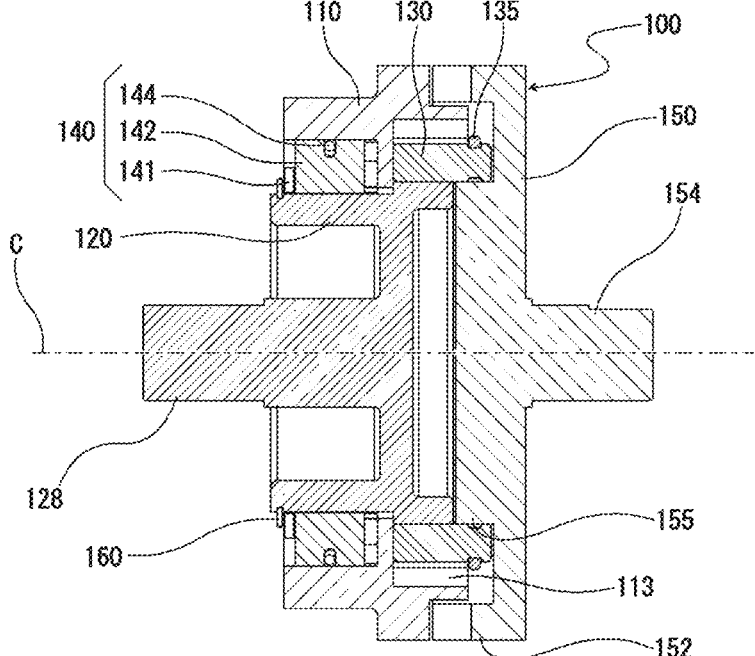
FIG. 5 is a cross-sectional view taken along a plane along the rotational axis when the operation mode of the selectable clutch is the two-way lock mode.
Figure 6:
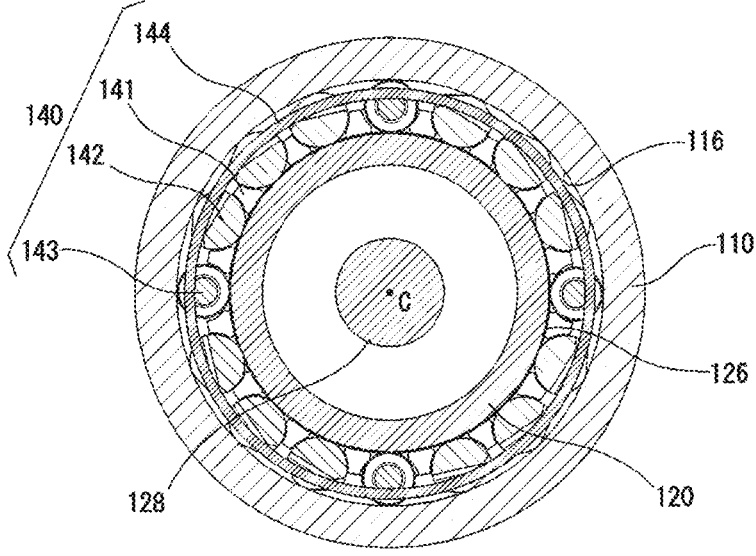
FIG. 6 is a cross-sectional view illustrating a structure of a second clutch mechanism included in the selectable clutch illustrated in FIG. 1, taken along a plane perpendicular to the rotational axis, with a viewpoint on the other end side in the axial direction.

The axial movements of the plurality of rollers 130 are restricted by the partitioning wall of the outer race 110 and the selector 150, as illustrated in FIG. 5.

In this embodiment, the elastic member 135 is a common component among the plurality of rollers 130, and is provided as an annular garter spring, for example. The elastic member 135 may also be provided as a ribbon spring, for example.

The elastic member 135 is mounted on the elastic member mounting grooves 131 of the respective rollers 130 from the radially outer side so that elastic force is exerted onto the rollers 130 radially inward toward the support grooves 122. In other words, the elastic member 135 is provided in such a manner that the rollers 130 are supported by the inner race 120, and exerts a biasing force to the rollers 130 to keep the first clutch mechanism at the ON state.

In the first clutch mechanism, when the outer race 110 or the inner race 120 is rotated while the rollers 130 are held inside the support grooves 122 of the inner race 120, each of the rollers 130 becomes nipped between the pocket 113 and support groove 122 corresponding thereto in the circumferential direction, so that the power is transmitted between the outer race 110 and the inner race 120, regardless of the rotational direction. By contrast, when the rollers 130 are housed inside the respective pockets 113 of the outer race 110, the rollers 130 are caused to idle, regardless of the rotational direction of the outer race 110 or the inner race 120.

The cam clutch unit 140 includes a cage ring 141 disposed between the second cylindrical part 115 of the outer race 110 and the small-diameter cylindrical part 125 of the inner race 120, coaxially with the outer race 110 and the inner race 120, a plurality of cams 142 and a plurality of concentric holding members 143 held swingably by the cage ring 141 and disposed inside the annular space formed between the second cylindrical part 115 of the outer race 110 and the small-diameter cylindrical part 125 of the inner race 120, in a manner aligned along the circumferential direction, and a biasing member 144 for biasing each of the plurality of cams 142 into contact with both of the outer race 110 and the inner race 120. Each of the concentric holding members 143 is provided as a cylindrical roller that has an annular spring mounting groove at the center in the axial direction. The biasing member 144 is provided as an annular spring, for example, and is fitted into the mounting grooves provided on the outer-race-side peripheral surfaces of the respective cams 142, from the radially outer side.

In the second clutch mechanism, when the inner race 120 having been sitting still is caused to rotate in one circumferential direction (the clockwise direction in FIG. 6, for example) in a view from the side of the one axial end, or when the outer race 110 having been sitting still is caused to rotate in the other circumferential direction (the counterclockwise direction in FIG. 6, for example), the cams 142 swing in an engaging direction, to become engaged with the outer race 110 and the inner race 120, and transmit the power between the outer race 110 and the inner race 120. When the outer race 110 and the inner race 120 are rotated in the same direction at the same speed, the cams 142 become engaged with the outer race 110 and the inner race 120, and transmit the power between the outer race 110 and the inner race 120.

By contrast, when the inner race 120 having been sitting still is caused to rotate in the other circumferential direction, or when the outer race 110 having been sitting still is caused to rotate in the one circumferential direction, the cams 142 swing in a disengaging direction, and cause the second clutch mechanism to idle. When the inner race 120 is rotated at a rotational speed higher than the outer race 110 while both of the outer race 110 and the inner race 120 are rotating in the one circumferential direction, or when the outer race 110 is rotated at a rotational speed higher than the inner race 120 while both of the outer race 110 and the inner race 120 are rotating in the other circumferential direction, the second clutch mechanism idles, and the transmission of power between the outer race 110 and the inner race 120 is cut off.

In this embodiment, the selector 150 is configured to switch the operation mode of the selectable clutch 100 between a two-way lock mode enabling the transmission of power in both of the rotational directions and a one-way lock mode enabling the transmission of power in one direction. Specifically, when the selector 150 sets the first clutch mechanism to the ON state enabling the transmission of power in both of the rotational directions, the operation mode of the selectable clutch 100 is set to the two-way lock mode; and when the selector 150 sets the first clutch mechanism to the OFF state for cutting off the transmission of power in both of the rotational directions, the operation mode of the selectable clutch 100 is set to the one-way lock mode.

The selector 150 includes a peripheral wall 151 having a cylindrical shape the outer diameter of which is equal to that of the first cylindrical part 111 of the outer race 110, an end wall 153 closing the other end of the peripheral wall 151 in the axial direction, a shaft 154 extending outward from an outer surface of the end wall 153 in the axial direction along the rotational axis C, and a control plate 155 provided on the inner surface of the end wall 153 so as to be positioned on the radially inner side of the rollers 130.

The selector 150 is connected to the outer race 110 by an engaging mechanism having a circumferential play permitting a relative rotation with respect to the outer race 110 within a predetermined rotational angle range, and the shaft 154 is connected to the input shaft element (not illustrated) to which a rotational torque is input.

The engaging mechanism is configured to transmit power by rotating the selector 150 so as to bring a plurality of dog teeth 152 provided to one end of the peripheral wall 151 of the selector 150 into engagement with a plurality of dog teeth 112 provided to the other end of the first cylindrical part 111 of the outer race 110. Each of the dog teeth 152 of the selector 150 is configured in such a manner that, when the dog tooth 152 comes into contact with adjacent one of the dog teeth 112 of the outer race 110, the dog tooth 152 forms a clearance with respect to the other adjacent one of the dog teeth 112. With this, because the selector 150 is ensured with a rotational play for the rotation of the selector 150 and therefore the power is not transmitted to the outer race 110 for rotation equivalent to the rotational play, the operation mode of the selectable clutch 100 can be switched by relatively rotating the selector 150 with respect to the outer race 110.

Figure 7:
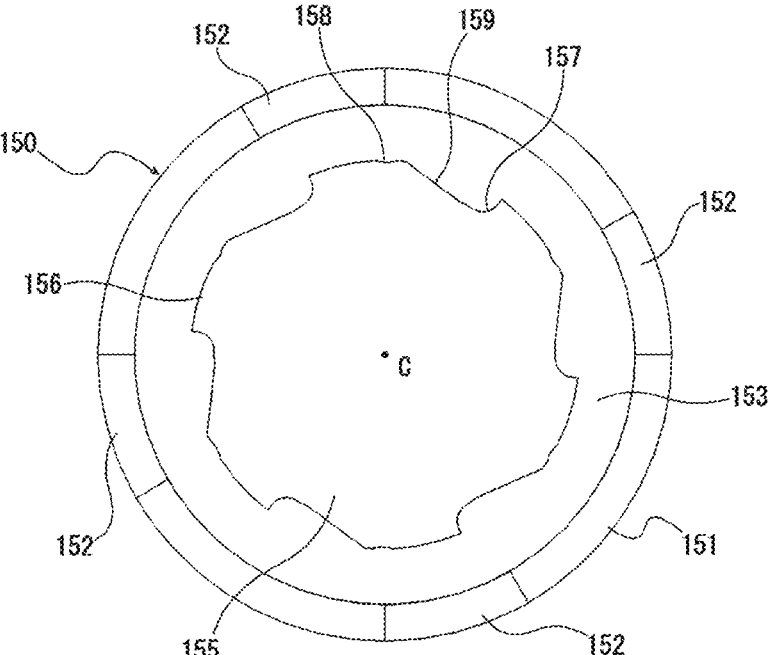
FIG. 7 is a plan view illustrating a structure of a selector included in the selectable clutch illustrated in FIG. 1, with a viewpoint on one end side in the axial direction.
Figure 8:
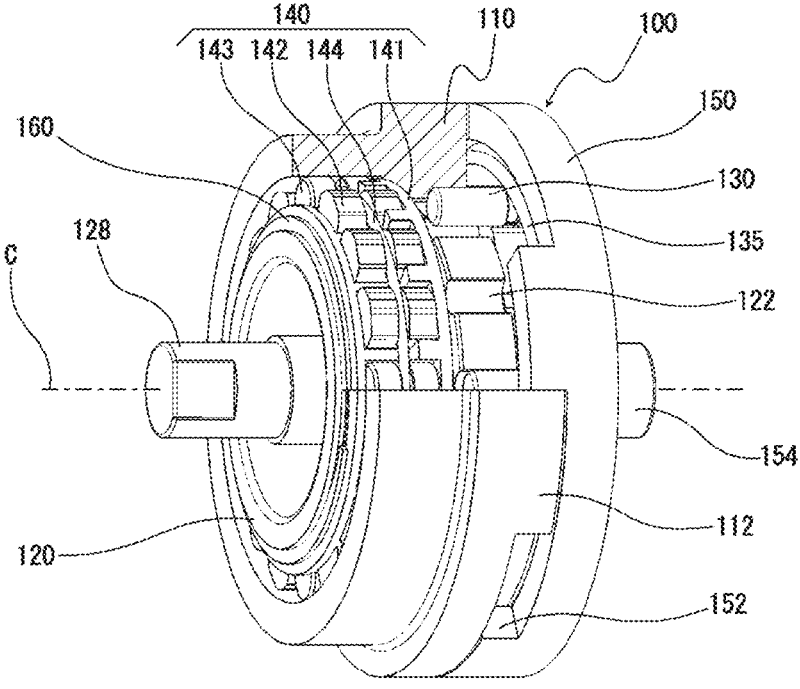
FIG. 8 is a partial cutaway perspective view illustrating the first clutch mechanism when the operation mode of the selectable clutch is a one-way lock mode.
Figure 9:
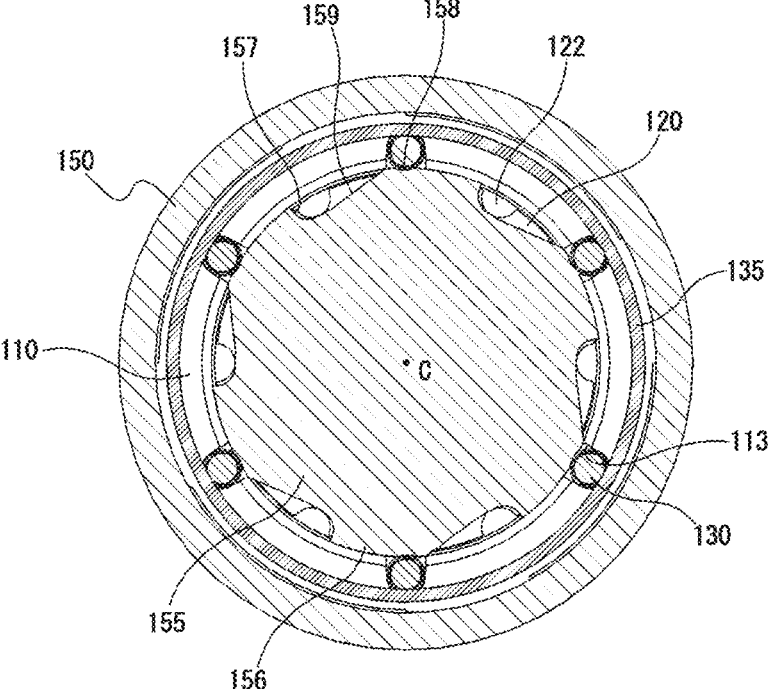
FIG. 9 is a cross-sectional view illustrating the first clutch mechanism taken along a plane perpendicular to the rotational axis when the operation mode of the selectable clutch is the one-way lock mode, with a viewpoint on the other end side in the axial direction.
Figure 10:
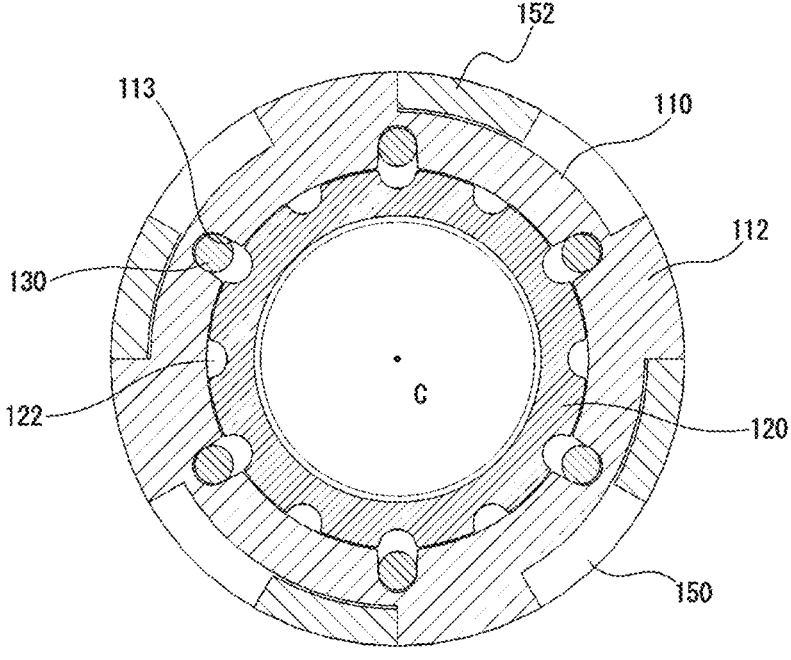
FIG. 10 is a cross-sectional view illustrating the first clutch mechanism taken along a plane perpendicular to the rotational axis at a different position from that in FIG. 9 when the operation mode of the selectable clutch is the one-way lock mode, with a viewpoint on the other end side in the axial direction.
Figure 11:
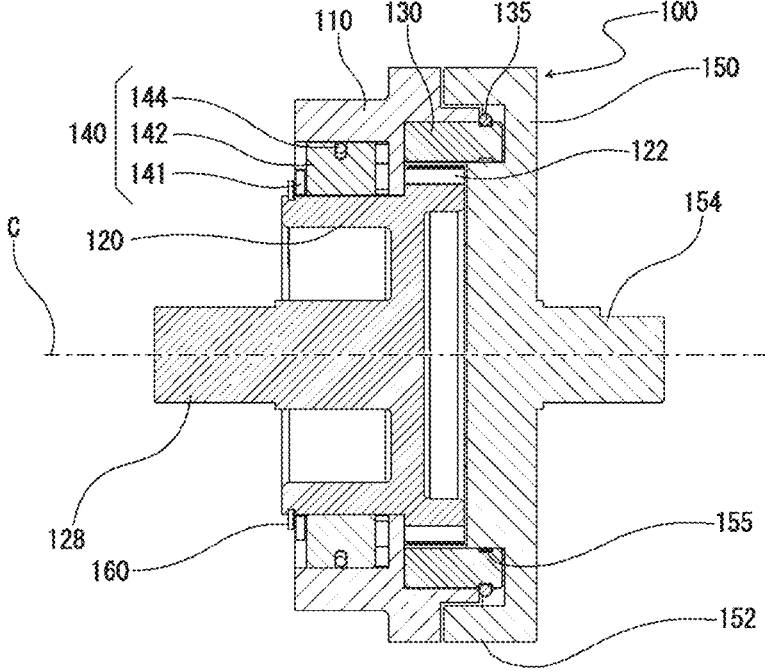
FIG. 11 is a cross-sectional view taken along a plane along the rotational axis when the operation mode of the selectable clutch is the one-way lock mode.

As illustrated in FIG. 7, the control plate 155 includes a plurality of teeth 156 that are provided on the outer peripheral surface of a disk-like base, being provided at equal intervals along the circumferential direction; roller holders 157 each provided between an adjacent pair of the teeth 156 and each configured to hold the corresponding roller 130 when the operation mode of the selectable clutch 100 is in the two-way lock mode, and roller holding grooves 158 each provided to the peripheral surface of the corresponding one of the teeth 156 and each configured to hold the corresponding roller 130 when the operation mode of the selectable clutch 100 is the one-way lock mode. The outer peripheral surface of the control plate 155 between the roller holder 157 and the roller holding groove 158 provides a cam surface 159. The distance between the peripheral surface of the cam surface 159 and the rotational axis C gradually increases from the roller holder 157 toward the roller holding groove 158 in the circumferential direction, in a plan view from a viewpoint on the one end side in the axial direction.

In the selectable clutch 100 described above, when the dog teeth 152 of the selector 150 is in contact with the dog teeth 112 of the outer race 110, on the one side in the circumferential direction (in the clockwise direction) in a view from a viewpoint on the side of the other axial end, each of the rollers 130 is held in the support groove 122 of the inner race 120 and the roller holder 157 of the selector 150, as illustrated in FIGS. 2 to 5. As a result, the first clutch mechanism is brought to the ON state enabling the transmission of power between the outer race 110 and the inner race 120 in both of the rotational directions, and the operation mode of the selectable clutch 100 is set to the two-way lock mode.

When the selector 150 is rotated in the other circumferential direction, in a view from the other axial end side, thereby bringing the dog teeth 152 into contact with the dog teeth 112 of the outer race 110 on the other side in the circumferential direction (counterclockwise direction), the cam surfaces 159 of the control plate 155 carry the respective rollers 130 radially outward against the elastic force of the elastic member 135, and the rollers 130 become housed inside the respective pockets 113 of the outer race 110, as illustrated in FIGS. 8 to 11. At this time, because the selector 150 is connected to the outer race 110 by the engaging mechanism with a play in the circumferential direction, the selector 150 is rotated relatively with respect to the outer race 110, so that the selector 150 does not transmit any power to the outer race 110. As a result, the first clutch mechanism is brought to the OFF state where the transmission of power between the outer race 110 and the inner race 120 is cut off in both of the rotational directions, and the operation mode of the selectable clutch 100 is switched to the one-way lock mode using the second clutch mechanism.

Figure 12:
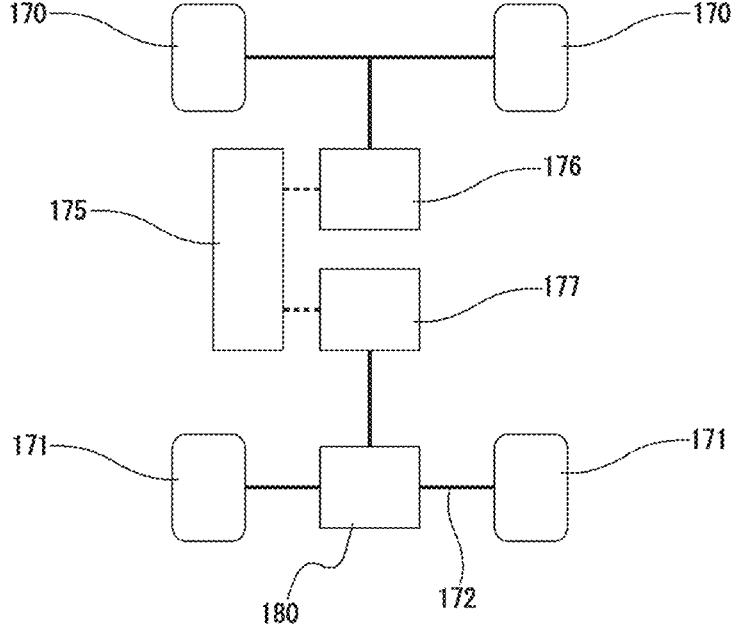
FIG. 12 is a schematic diagram illustrating an application example of a disconnect mechanism according to the present invention.

The selectable clutch 100 can be suitably used for, for example, a disconnect mechanism for switching the driving mode of a four-wheel drive vehicle, in which one of the front pair of right and left wheels and the rear pair of the right and left wheels is used as driving wheels driven by the driving force of a main driving motor and the other of the front pair of right and left wheels and the rear pair of the right and left wheels is used as auxiliary driving wheels driven by the driving force of an auxiliary driving motor, between a four-wheel driving (4WD) mode and a two-wheel driving (2WD) mode. An application example of the disconnect mechanism is illustrated in FIG. 12.

In this example, the front left and right wheels are used as driving wheels 170 driven by the driving force of the main driving motor 176, and the rear left and right wheels are used as the auxiliary driving wheels 171 driven by the driving force of the auxiliary driving motor 177. The reference numeral 175 denotes a battery for supplying the power to the main driving motor 176 and the auxiliary driving motor 177.

The disconnect mechanism 180 includes the selectable clutch 100 described above, and is enabled to connect and to disconnect the transmission of the driving force between the auxiliary driving motor 177 and the auxiliary driving wheels 171.

In the selectable clutch 100, the shaft 128 of the inner race 120 is coupled to an auxiliary driving wheel axle 172, which is the output shaft element, with a suitable coupling member (not illustrated), and the shaft 154 of the selector 150 is connected to the motor shaft of the auxiliary driving motor 177, the motor shaft being the input shaft element, with a suitable connecting member (not illustrated) so that the inner race 120 is caused to rotate in the other circumferential direction (by referring to FIG. 6, for example, in the counterclockwise direction in FIG. 6), when the auxiliary driving wheel axle 172 rotates in the forward direction.

The operation of switching the driving mode of the four-wheel drive vehicle will now be explained.

Figure 13:
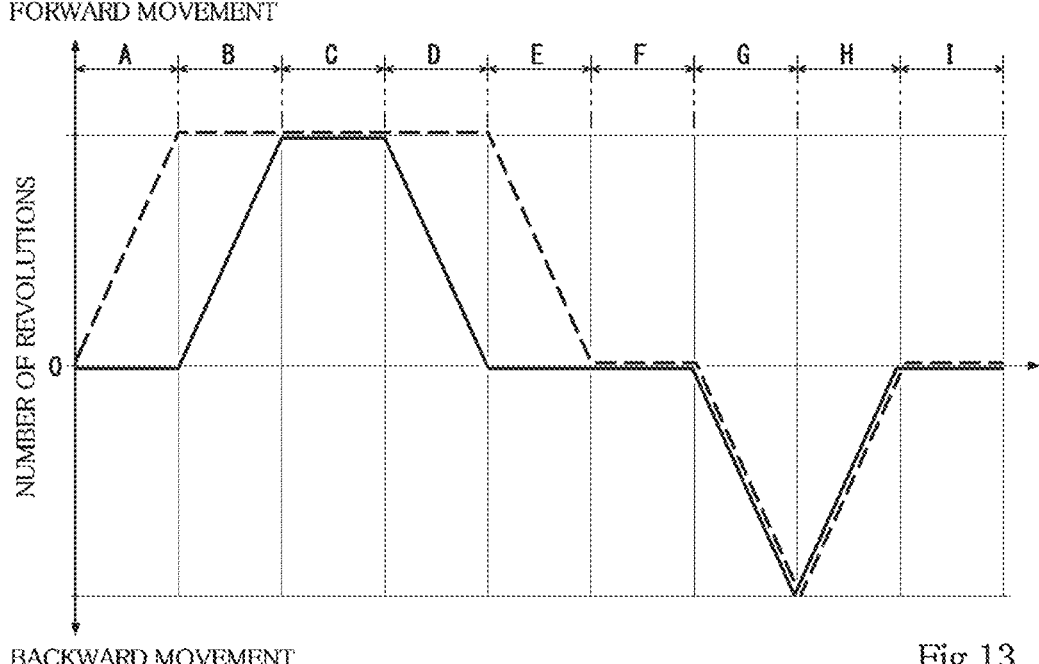
FIG. 13 is a graph illustrating a relationship between the driving mode of a four-wheel drive vehicle, and the number of revolutions of an auxiliary driving wheel axle and the number of revolutions of the motor shaft of an auxiliary driving motor.

FIG. 13 is a graph illustrating a relationship between the driving mode of the four-wheel drive vehicle, and the number of revolutions of the auxiliary driving wheel axle and the number of revolutions of the motor shaft of the auxiliary driving motor. In FIG. 13, the broken line indicates a change in the number of revolutions of the auxiliary driving wheel axle 172, and the solid line indicates a change in the number of revolutions of the motor shaft of the auxiliary driving motor 177. The number of revolutions of the auxiliary driving wheel axle 172 is synchronous with the number of revolutions of the motor shaft of the main driving motor 176.

During the acceleration in the 2WD forward driving mode (section A in FIG. 13), the selector 150 is controlled to bring the first clutch mechanism to the OFF state (see FIGS. 8 to 11), and the selectable clutch 100 is in the one-way lock mode. The inner race 120 connected to the auxiliary driving wheel axle 172 rotates in the other circumferential direction, but the second clutch mechanism idles because the cams 142 in the second clutch mechanism has swung in the direction releasing the engagement. Therefore, the power of the auxiliary driving wheel axle 172 is not transmitted to the outer race 110. Furthermore, because the first clutch mechanism is in the OFF state and the auxiliary driving motor 177 is not running, the selector 150 and the outer race 110 remain still (without moving).

When the driving mode is switched from the 2WD mode to the 4WD mode while the vehicle is moving forward (section B in FIG. 13), the motor shaft of the auxiliary driving motor 177 is driven to rotate forward. At this time, because the number of revolutions of the motor shaft of the auxiliary driving motor 177 is less than the number of revolutions of the auxiliary driving wheel axle 172, the outer race 110 rotates at a rotational speed lower than that of the inner race 120, and the second clutch mechanism keeps idling.

Once the rotational speed of the motor shaft of the auxiliary driving motor 177 reaches the rotational speed of the auxiliary driving wheel axle 172 (section C in FIG. 13), the outer race 110 and the inner race 120 rotate in the same direction at the same speed, and the cams 142 become engaged with the outer race 110 and the inner race 120. As a result, the power of the auxiliary driving motor 177 becomes transmitted to the auxiliary driving wheels 171, and the driving mode is switched to the 4WD mode.

When the driving mode is switched from the 4WD mode to the 2WD mode while driving forward (section D in FIG. 13), the auxiliary driving motor 177 stops. As a result, as the number of revolutions of the motor shaft of the auxiliary driving motor 177 becomes smaller than the number of revolutions of the auxiliary driving wheel axle 172, the rotational speed of the outer race 110 drops below the rotational speed of the inner race 120, so that the cams 142 become disengaged from the outer race 110 and the inner race 120, and the second clutch mechanism starts to idle. Accordingly, the transmission of the power from the auxiliary driving motor 177 to the auxiliary driving wheels 171 is cut off, and the driving mode is switched to the 2WD mode.

While deceleration in the forward driving in the 2WD mode or braking (section E in FIG. 13), too, the first and second clutch mechanisms keep idling.

When the four-wheel drive vehicle is to be moved back from the parked state (section F in FIG. 13), to begin with, the selector 150 is controlled to bring the first clutch mechanism to the ON state (see FIGS. 2 to 5). Specifically, by driving the motor shaft of the auxiliary driving motor 177 to rotate reversely, and causing the selector 150 to rotate relatively with respect to the outer race 110 in the one circumferential direction, the dog teeth 152 of the selector 150 come into abutment against the respective dog teeth 112 of the outer race 110, the respective dog teeth 112 being those on the one side in the circumferential direction. As a result, the first clutch mechanism is switched to the ON state. After the first clutch mechanism is switched to the ON state, the auxiliary driving motor 177 is stopped.

When both of the main driving motor 176 and the auxiliary driving motor 177 are then driven reversely (section G in FIG. 13), the outer race 110 of the second clutch mechanism is caused to rotate together with the selector 150. As a result, the rollers 130 become nipped between the pockets 113 and the support grooves 122 in the circumferential direction, and the outer race 110 and the inner race 120 become engaged with each other, so that the driving force of the auxiliary driving motor 177 is transmitted to the auxiliary driving wheels 171. Accordingly, the four-wheel drive vehicle is driven backward in the 4WD mode.

By stopping the auxiliary driving motor 177, the driving mode of the four-wheel drive vehicle is switched to the 2WD mode (section H in FIG. 13). By stopping the auxiliary driving motor 177, the transmission of the power from the auxiliary driving motor 177 to the auxiliary driving wheels 171 is cut off, but the second clutch mechanism is kept engaged, so that the driving force of the auxiliary driving wheels 171 is transmitted to the auxiliary driving motor 177 (regenerative function). In this example, when the auxiliary driving motor 177 stops, the rotational speed of the motor shaft of the main driving motor 176 drops (the four-wheel drive vehicle decelerates). However, even if the rotational speed of the inner race 120 drops due to the drop in the rotational speed of the auxiliary driving wheel axle 172, the first clutch mechanism is kept engaged.

When the four-wheel drive vehicle is to be moved forward in the 2WD mode, for example, after the four-wheel drive vehicle stops (section I in FIG. 13), the selector 150 is controlled to bring the first clutch mechanism to the OFF state (see FIGS. 8 to 11). Specifically, by driving the motor shaft of the auxiliary driving motor 177 to rotate forward, and causing the selector 150 to rotate relatively with respect to the outer race 110 in the other circumferential direction, the dog teeth 152 of the selector 150 come into abutment against the respective dog teeth 112 of the outer race 110, the respective dog teeth 112 being those on the other side in the circumferential direction. As a result, the first clutch mechanism is switched to the OFF state. After the first clutch mechanism is switched to the OFF state, the auxiliary driving motor 177 is stopped.

In the manner described above, with the disconnect mechanism 180 according to the present invention, by switching the operation mode of the selectable clutch 100 by controlling the number of revolutions and the rotational direction of the auxiliary driving motor 177, it is possible to switch to enable and to cut off the transmission of power from the auxiliary driving motor 177 to the auxiliary driving wheels 171, both while the four-wheel drive vehicle is driving forward and backward, and to simplify the structure and to achieve a size reduction of the structure. Furthermore, because the selectable clutch 100 is configured to automatically switch to engage and to idle, in accordance with the rotational speeds of the outer race 110 and the inner race 120, it is possible to switch the driving mode of the four-wheel drive vehicle smoothly and quickly.

While the embodiment of the present invention has been described in detail, the present invention is not limited to the above embodiment, and various design changes can be made without departing from the invention described in the claims.

For example, in the configuration of the first clutch mechanism described above, the support grooves are provided on the outer peripheral surface of the inner race; the pockets are provided on the inner peripheral surface of the outer race; and the elastic member is disposed in a manner biasing the rollers radially inward. However, it is also possible to provide the support grooves on the inner peripheral surface of the outer race, and to provide the pockets to the outer peripheral surface of the inner race. In such a structure, the control plate of the selector may be provided with an annular shape and disposed on the radially outer side of the rollers. The elastic member may then be disposed in a manner biasing the rollers radially outward.

Furthermore, in the embodiment described above, the first clutch mechanism is configured as a roller clutch and the second clutch mechanism is configured as a cam clutch; however, the first clutch mechanism is not limited to a roller clutch, and may also be configured as a cam clutch, a plate clutch, or a pawl clutch, for example, as long as such a clutch is enabled to switch to transmit power and to cut off the transmission of the power. Furthermore, the second clutch mechanism is not limited to a cam clutch, and a roller clutch, a ratchet clutch, or the like may be used as long as the clutch is configured as one-way clutch.

What is claimed is:

1. A selectable clutch comprising:
   a first clutch mechanism including an input-side rotating element, an output-side rotating element, and a power-transmitting element that transmits or cuts off power between the input-side rotating element and the output-side rotating element in both rotational directions; and
   a selector that performs ON/OFF operations of the first clutch mechanism, wherein
   the selector is coupled to an input shaft element to which a rotational torque is input, and coupled to the input-side rotating element by an engaging mechanism having a circumferential play permitting a relative rotation with respect to the input-side rotating element within a predetermined rotational angle range.

2. The selectable clutch according to claim 1, further comprising a second clutch mechanism that transmits or cuts power between the input-side rotating element and the output-side rotating element, wherein
   the second clutch mechanism is configured as a one-way clutch.

3. The selectable clutch according to claim 2, wherein
   the input-side rotating element and the output-side rotating element are configured as an outer race and an inner race, respectively, that are provided coaxially and relatively rotatably with respect to each other, and
   the second clutch mechanism is configured as a plurality of cams, each of which is swingably held on a cage ring disposed between the outer race and the inner race, while the cams are being biased, by a biasing member, to rotate in an engagement direction.

4. A disconnect mechanism for switching, between a four-wheel drive mode and a two-wheel drive mode, a driving mode of a four-wheel drive vehicle, in which one of a pair of front right and left wheels and a pair of rear right and left wheels is used as driving wheels driven by a driving force of a main driving motor, and another one of a pair of front right and left wheels and a pair of rear right and left wheel is used as auxiliary driving wheels driven by a driving force of an auxiliary driving motor, the disconnect mechanism comprising
   the selectable clutch according to claim 2, wherein
   the output-side rotating element of the selectable clutch is coupled to an auxiliary driving wheel axle, and the selector is coupled to a motor shaft of the auxiliary driving motor, and
   the output-side rotating element of the selectable clutch is enabled to connect and to disconnect transmission of driving force between the auxiliary driving motor and the auxiliary driving wheels.

5. The selectable clutch according to claim 1, wherein the selector is configured switchable between an ON state in which the power-transmitting element is enabled to transmit power from the input-side rotating element to the output-side rotating element and an OFF state in which the power-transmitting element cuts off transmission of power from the input-side rotating element to the output-side rotating element, by rotating the selector relatively with respect to the input-side rotating element.

6. The selectable clutch according to claim 1, wherein the engaging mechanism is configured to transmit power by engaging dog teeth that are provided on the input-side rotating element and dog teeth that are provided on the selector.

7. The selectable clutch according to claim 1, wherein the input-side rotating element and the output-side rotating element are configured as an outer race and an inner race, respectively, that are provided coaxially and relatively rotatably with respect to each other, the power-transmitting element is configured as a plurality of rollers provided between the outer race and the inner race along a circumferential direction, in a manner being biased by an elastic member in a radial direction, one of an inner peripheral surface of the outer race and an outer peripheral surface of the inner race is provided with pockets configured to house the rollers, respectively, and another one of the inner peripheral surface of the outer race and the outer peripheral surface of the inner race is provided with support grooves configured to support the rollers, respectively, and the selector includes a control plate that is disposed on an outer race side or an inner race side of the rollers, and an inner peripheral surface or an outer peripheral surface of which is provided with a plurality of teeth; the control plate has a cam surface on a peripheral surface between the teeth, the cam surface being a surface a distance of which, from a rotational axis, gradually increases or decreases in a circumferential direction; and the rollers are enabled to move in a radial direction by moving the selector relatively with respect to the outer race.

\* \* \* \* \*